United States Patent
Han et al.

(10) Patent No.: US 8,508,692 B2
(45) Date of Patent: Aug. 13, 2013

(54) BACKLIGHT UNIT AND LIQUID CRYSTAL DISPLAY USING THE SAME COMPRISING FIRST AND SECOND LIGHT GUIDE PLATE ARRAYS CONNECTED TO AND INDEPENDENTLY CONTROLLED BY FIRST AND SECOND LIGHT ARRAY DRIVING PARTS RESPECTIVELY

(75) Inventors: Jaejung Han, Seoul (KR); Juyoung Bang, Seoul (KR); Dukjin Jun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 282 days.

(21) Appl. No.: 12/591,835

(22) Filed: Dec. 2, 2009

(65) Prior Publication Data
US 2010/0253881 A1 Oct. 7, 2010

(30) Foreign Application Priority Data
Apr. 1, 2009 (KR) .................. 10-2009-0028154

(51) Int. Cl.
*G02F 1/1335* (2006.01)
*G02F 1/133* (2006.01)
*F21V 7/04* (2006.01)

(52) U.S. Cl.
USPC ............................. 349/65; 349/73; 362/616

(58) Field of Classification Search
USPC ......... 349/56, 61, 62, 65, 73; 362/97.1–97.4, 362/600, 615, 616
See application file for complete search history.

(56) References Cited

U.S. PATENT DOCUMENTS

| | | | |
|---|---|---|---|
| 2004/0130884 A1 | 7/2004 | Yoo et al. | |
| 2005/0140847 A1* | 6/2005 | Jeon | 349/62 |
| 2005/0270796 A1* | 12/2005 | Ichikawa et al. | 362/559 |
| 2009/0168455 A1* | 7/2009 | Kim et al. | 362/613 |
| 2009/0267890 A1* | 10/2009 | Park et al. | 345/102 |

FOREIGN PATENT DOCUMENTS

| | | |
|---|---|---|
| CN | 201107519 | 8/2008 |
| TW | 200302377 | 8/2003 |
| TW | 200604675 | 2/2006 |

* cited by examiner

*Primary Examiner* — Paul Lee
(74) *Attorney, Agent, or Firm* — McKenna Long & Aldridge LLP

(57) ABSTRACT

A backlight unit capable of improving contrast properties by implementing a local dimming method while making the backlight unit slim, and a liquid crystal display using the same are provided. The backlight unit includes a first light guide plate array including a plurality of first light guide plates arranged in parallel in a first direction to define a first light guide channels; a second light guide plate array including a plurality of second light guide plates arranged in parallel in a second direction intersected with the first direction to a second light guide channels; a first light array arranged near at least one end of the first light guide plate array to illuminate light to the at least one end of the first light guide plate array; and a second light array arranged near at least one end of the second light guide plate array to illuminate light to the at least one end of the second light guide plate array.

12 Claims, 11 Drawing Sheets

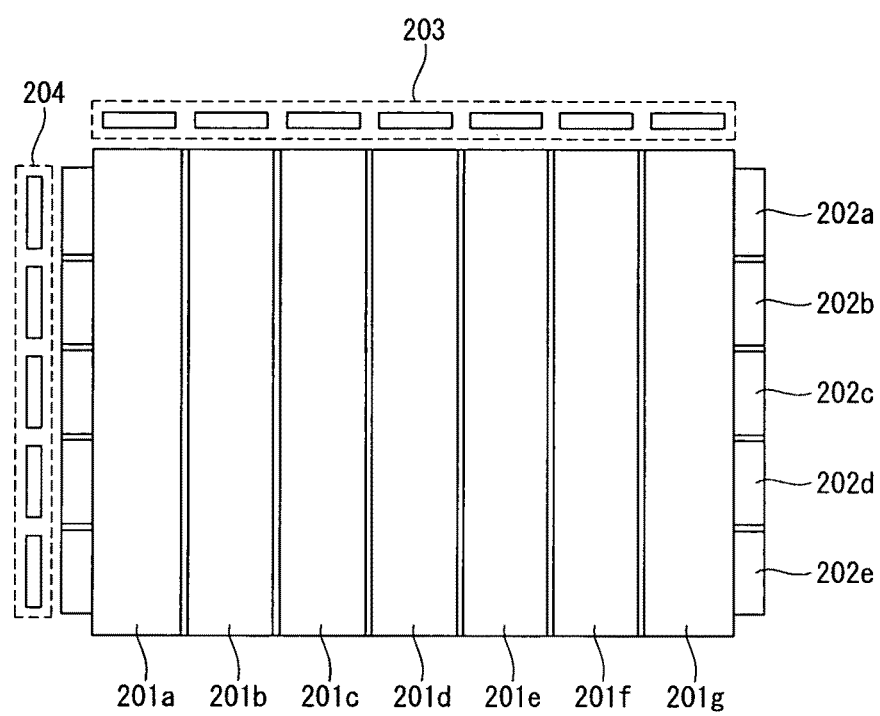

| B11 | B12 | B13 | B14 | B15 | B16 | B17 |
|-----|-----|-----|-----|-----|-----|-----|
| B21 | B22 | B23 | B24 | B25 | B26 | B27 |
| B31 | B32 | B33 | B34 | B35 | B36 | B37 |
| B41 | B42 | B43 | B44 | B45 | B46 | B47 |
| B51 | B52 | B53 | B54 | B55 | B56 | B57 |

FIG. 12

| Condition | undivided LGP | divided LGP |
|---|---|---|
|  |  |  |
| light-incedent part (lm) | 1.804 | 1.737 |
| light-incedent opposite part (lm) | 0.429 | 0.860 |
| ratio(%) | 24% | 50% |

BACKLIGHT UNIT AND LIQUID CRYSTAL DISPLAY USING THE SAME COMPRISING FIRST AND SECOND LIGHT GUIDE PLATE ARRAYS CONNECTED TO AND INDEPENDENTLY CONTROLLED BY FIRST AND SECOND LIGHT ARRAY DRIVING PARTS RESPECTIVELY

This application claims the benefit of Korea Patent Application No. 10-2009-0028154 filed on Apr. 1, 2009, which is incorporated herein by reference for all purposes as if fully set forth herein.

BACKGROUND OF THE INVENTION

1. Field of the Invention

Exemplary embodiments of the invention relate to a backlight unit capable of local dimming and a liquid crystal display using the same.

2. Discussion of the Related Art

A liquid crystal display according to an active matrix driving method displays moving pictures using thin film transistors (TFTs) as switching elements. The liquid crystal display is applied television sets as well as portable information devices, office automation apparatuses, computers because it is possible to be made thinner than a cathode ray tube (CRT). Accordingly, the liquid crystal display rapidly replaces the CRT in a recent.

The liquid crystal displays have an increasing application range because of light-weight, thin, low-power consumption features. The liquid crystal display has been used for portable computers such as laptop computers, office automation apparatuses, audio/video devices, and indoor/outdoor advertisement displays. A transmissive type liquid crystal display which occupies all most liquid crystal display devices displays a desired picture by controlling an electrical field applied to liquid crystal layer to modulate light-incedent from a backlight unit. The backlight unit is mainly classified into a direct type and an edge type.

Picture quality of the liquid crystal display depends on contrast property. The method improving the picture quality by modulating light-incedent from the backlight unit has a limitation. In order to improving the contrast property, a backlight dimming control method which adjusts luminance of the backlight unit according to the picture has been variously attempted. The backlight dimming control method may reduce power consumption by adaptably adjusting the luminance of the backlight unit depending on an input picture. The backlight dimming control method includes a global dimming method entirely adjusting luminance of a display screen and a local dimming method locally adjusting luminance of the display screen. The global dimming method may improve dynamic contrast measured between a previous frame and a next frame but it is difficult to improve static contrast. On the other hand, the local dimming method may improve static contrast by locally controlling luminance of the display screen in one frame period. However, the local dimming method needs a very complicated construction and algorithm because it makes luminance differences and flickers between a plurality of blocks divided in the display screen and flicker and also it needs many circuit elements. Also, the local dimming method is applicable to only the liquid crystal display using the direct type backlight unit.

The edge type backlight unit has a construction in which a light source is arranged to face a side surface of a light guide plate and a plurality of optical sheets are disposed between a liquid crystal display panel and the light guide plate. The edge backlight unit may be implemented to have a structure thinner than the direct type backlight unit. However, it is impossible to apply the local dimming method to of the edge type backlight unit because the light source illustrates one side of the light guide plate and the light guide plate serves to convert a spot light source or a line light source into a surface light source.

On the contrary, the direct type backlight unit has a construction in which a plurality of optical sheets and a diffusion plate are disposed under the liquid crystal display panel and a plurality of light sources are disposed under the diffusion plate. Even though the direct type backlight unit implements the local dimming method because the plurality of light sources are disposed under the diffusion plate and can be independently controlled, it is difficult to reduce a thickness thereof. Accordingly, it causes a problem to make a slim design of the liquid crystal display difficult. The reason why the direct type backlight unit can not be made to a slim construction is a space which is necessarily formed between the light sources and the diffusion plate. The diffusion plate diffuses light-incedent from the light sources to make luminance of the display screen uniformly. In order to sufficiently diffuse light-incedent from the light sources, the space between the light sources and the diffusion plate should be sufficiently guaranteed. According to the trend requiring the slim liquid crystal display, the space between the light sources and the diffusion plate is narrowed in gradual, but it makes bright lines on the display screen to lower a luminance evenness of the display screen because the light sources are observed on the display screen when the light from the light sources can not be sufficiently diffused. In order to resolve the problem about the luminance evenness of the display screen, there have been proposed many resolutions such as a method increasing number and arrangement density of the light sources, a method enforcing a diffusing function by forming minute patterns or lens patterns on the diffusion plate facing the liquid crystal display panel and so on. However, the above methods also may cause an increased cost and have definite limitations in respect of improving the diffusion of light.

SUMMARY OF THE INVENTION

Exemplary embodiments of the invention provide a backlight unit capable of improving contrast properties by implementing a local dimming method while making the backlight unit slim, and a liquid crystal display using the same.

In an aspect, a backlight unit includes a first light guide plate array including a plurality of first light guide plates arranged in parallel in a first direction to define a plurality of first light guide channels; a second light guide plate array including a plurality of second light guide plates arranged in parallel in a second direction intersected with the first direction to define a plurality of second light guide channels, the second light guide plate array being disposed under the first light guide plate array; a first light array arranged near at least one end of the first light guide plate array to illuminate light to the at least one end of the first light guide plate array; and a second light array arranged near at least one end of the second light guide plate array to illuminate light to the at least one end of the second light guide plate array.

In another aspect, a liquid crystal display includes a liquid crystal display panel; and a backlight unit that illuminates light to the liquid crystal display panel, wherein the backlight unit includes a first light guide plate array including a plurality of first light guide plates arranged in parallel in a first direction to define a plurality of first light guide channels, a second light guide plate array including a plurality of second light guide plates arranged in parallel in a second direction intersected with the first direction to define a plurality of second light guide channels, a first light array arranged near at least one end of the first light guide plate array to illuminate light to the at least one end of the first light guide plate array, and a second light array arranged near at least one end of the second light guide plate array to illuminate light to the at least one end of the second light guide plate array.

In the backlight unit, surface light illuminated from the first and the second light guide plates is divided into to correspond to a plurality of blocks having a matrix shape by the intersection of the first light guide light channels and the second light guide light channel.

In the backlight unit, the first light array includes a plurality of first light sources arranged to correspond to the one ends of the plurality of first light guide plates, and a plurality of second light sources arranged to correspond to the other ends of the first light guide plates, and the second light array includes a plurality of third light sources arranged to correspond to the one ends of the plurality of second light guide plates, and a plurality of fourth light sources arranged to correspond to the other ends of the second light guide plates.

In the backlight unit, the light guide plates in at least one of the first and second light guide plate arrays have minute intaglio or embossed patterns which are formed on at least one of upper surfaces, lower surfaces, and the more minute intaglio or embossed patterns are far from the first or the second light array, the more minute intaglio or embossed patterns are formed in dense.

In the backlight unit, each of the first and second light guide plates has a flat plate shape.

In the backlight unit, each of the first light guide plates has a flat plate shape, and each of the second light guide plates has a wedge plate shape of which lower surface is inclined.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 is a plan view showing another example of arrangement of first and second light sources which illuminate first and second light guide plates disposed to cross each other;

FIG. 12 is a diagram showing an experimental result measuring the luminance in the related art light guide plate and the light guide plates according to the exemplary embodiment of this invention.

DETAILED DESCRIPTION OF THE ILLUSTRATED EMBODIMENTS

Hereinafter, exemplary embodiments of the invention will be described in detail with reference to the accompanying drawings so that this disclosure is thorough and complete and fully conveys the concept of the invention to those skilled in the art. This invention may, however, be embodied in many different forms and should not be construed as being limited to the embodiments set forth herein.

Figure 1:
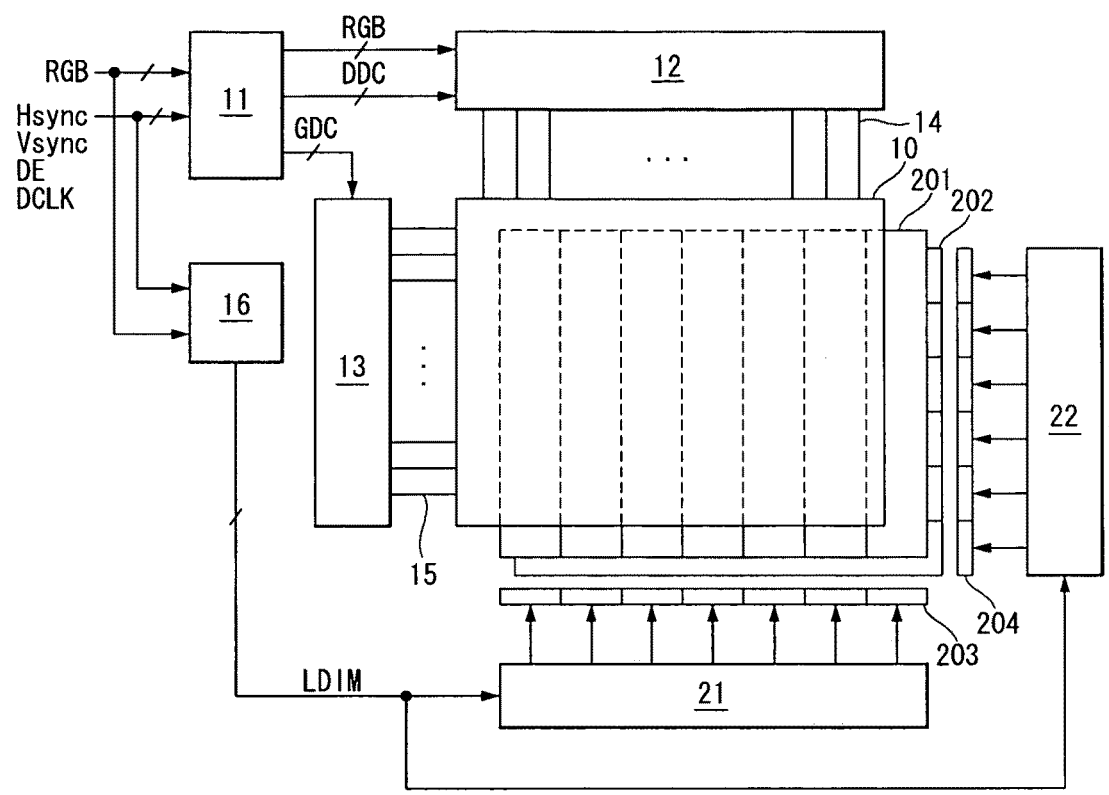
FIG. 1 is a block diagram showing a liquid crystal display according to a first exemplary embodiment of the invention.
Figure 2:
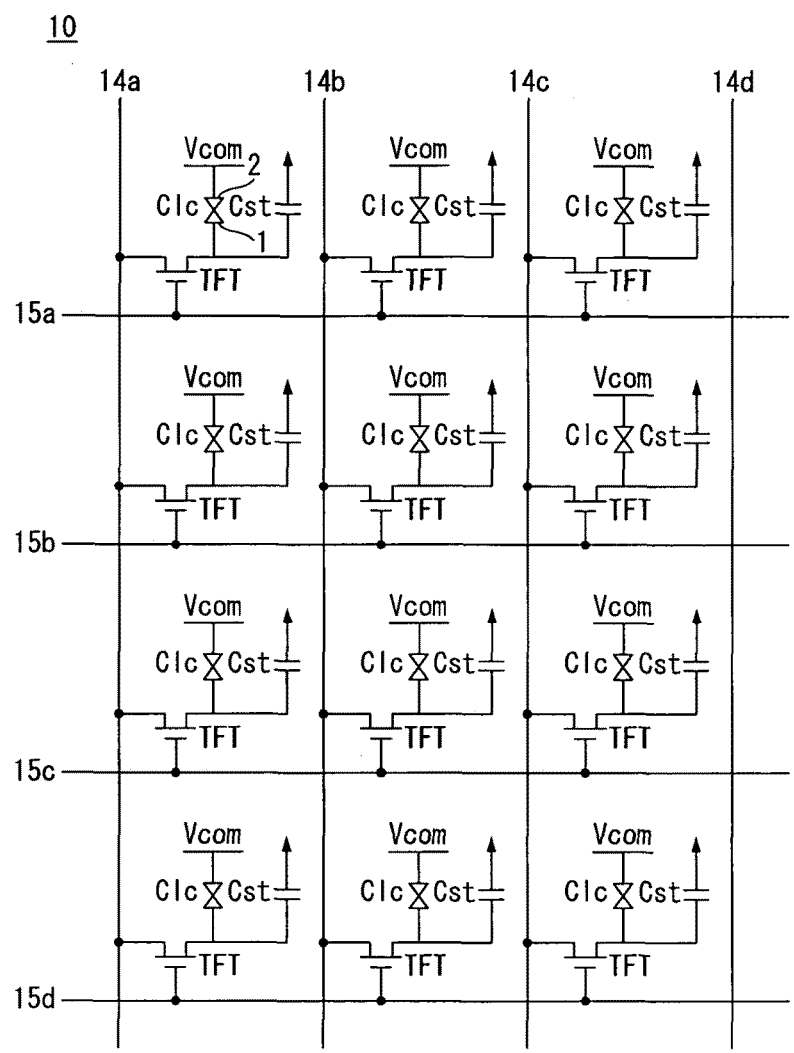
FIG. 2 is an equivalent circuit of a part of pixel array of the liquid crystal display shown in FIG. 1.
Figure 3:
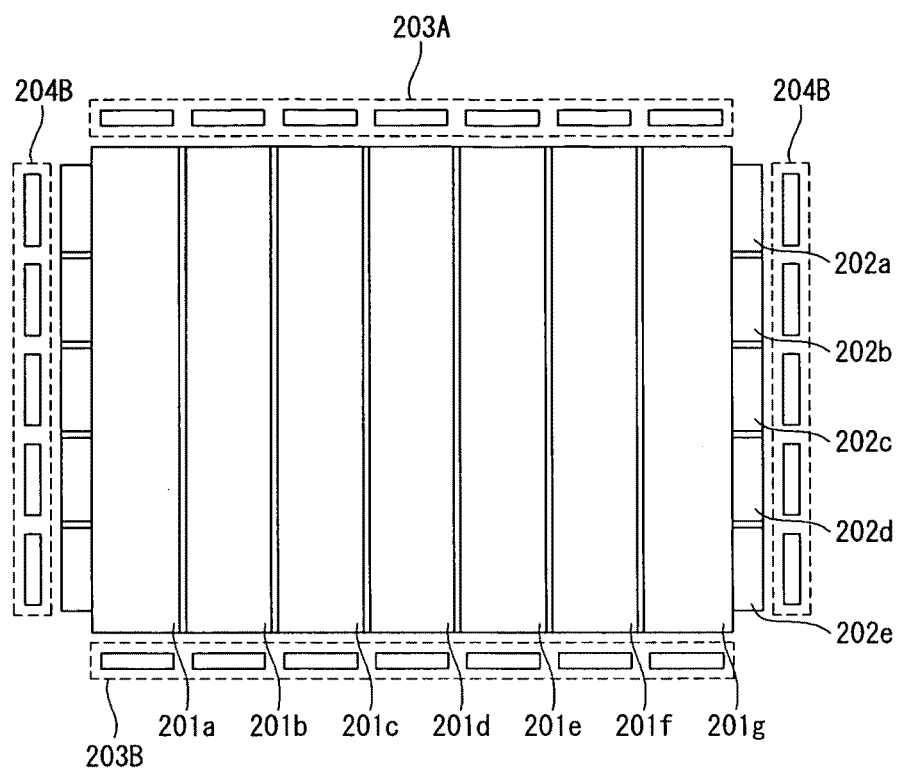
FIG. 3 is a plan view showing one example of arrangement of first and second light sources which illuminate first and second light guide plates disposed to cross each other.

Referring to FIGS. 1 to 3, a liquid crystal display according to an exemplary embodiment of the invention comprises a liquid crystal display panel 10, a data driving part 12 for driving data lines 14 of the liquid crystal display panel 10, a gate driving part 13 for driving gate lines 15 of the liquid crystal display panel 10, a timing controller 11 for controlling the data driving part 12 and the gate driving part 13, a backlight unit for illuminating light to the liquid crystal display panel 10, light array driving parts 21 and 22 for driving light sources 203 and 204 of the backlight unit, and a picture analyzing part 16 for analyzing an input picture and controlling the first and second light array driving parts 21 and 22 according to the analyzed results.

The liquid crystal display panel 10 includes liquid crystal layer formed between an upper glass substrate and a lower glass substrate. A plurality of data lines 14a to 14d and a plurality of gate lines 15a to 15d are cross each other on the lower glass substrate as shown in FIG. 2. Liquid crystal cells Clc are arranged in the liquid crystal display panel 10 in a matrix shape by the cross of the data lines and the gate lines. Also, thin film transistors (TFTs), pixel electrodes 1 of the liquid crystal cells Clc connected to the TFTs, and storage capacitors are formed on the lower glass substrate.

Black matrices, color filters and common electrodes 2 of the liquid crystal cells Clc are formed on the upper substrate. The common electrode 2 is formed on the upper substrate in a vertical electrical field type driving method such as a twisted nematic (TN) mode, however a vertical alignment (VA) mode, and is formed on the lower glass substrate together with the pixel electrode 1 in a horizontal electrical field type driving method such as an in-plane switching (IPS) mode and a fringe field switching (FFS) mode. Polarizers are formed on the upper and lower glass substrates, respectively, and alignment layers are respectively formed on the inner surfaces of the substrates abutting with liquid crystals to set pre-tilt angle of the liquid crystals.

The data driving part 12 comprises a plurality of data driving integrated chips (ICs). Each of the plurality of data driving ICs includes a shift register for sampling a clock signal, a data register for temporarily storing the digital picture data RGB, a latch for storing the digital picture data by one line at a time in response to the clock signals supplied from the shift registers and outputting the stored digital picture data, a digital/analog converter for selecting a positive polarity gamma compensating voltage or a negative polarity gamma compensating voltage corresponding to the digital picture data supplied from the latch by referring to a gamma reference voltage, a multiplexer for selecting the data line to which the analog data converted by the positive polarity gamma compensating voltage or the negative polarity gamma compensating voltage is supplied, and an output buffer connected between the multiplexer and the data line DL. The data driving part 12 latches the digital picture data RGB under a control of the timing controller 11, converts the latched digital picture data into a positive or negative polarity analog data voltage using the positive or negative polarity gamma compensating voltage, and outputs the positive or negative polarity analog data voltage to the data lines 14.

The gate driving part 13 comprises a plurality of gate driving integrated chips (ICs). Each of the plurality of gate driving ICs includes a shift register, a level shifter converting an output signal supplied from the shift register into a signal having a swing width adapted to drive the TFT, and an output buffer connected between the level shifter and the gate lines 15. The gate driving part 13 sequentially outputs gate pulses (or scan pulses) having a pulse width of about one horizontal period under a control of the timing controller 11 and supplies them to the gate lines 15.

The timing controller 11 receives the digital picture data RGB from a system board to which an external picture source is mounted, rearranges the digital picture data RGB to meet the resolution of the liquid crystal display panel 10, and outputs the rearranged digital picture data RGB to the data driving part 12. And, the timing controller 11 generates a data timing control signal DDC for controlling an operating timing of the data driving part 12 and a gate timing control signal GDC for controlling an operating timing of the gate driving part 13 based on timing signals including a vertical synchronizing signal Vsync, a horizontal vertical synchronizing signal Hsync, a data enable signal DE and a dot clock signal DCLK. The timing controller 11 inserts an interpolation frame between frames of the input picture signal which is input thereto in a frame frequency of 60 Hz, and controls the operation of the data driving part 12 and the gate driving part 13 in a frame frequency of 60*N (herein, N is an integer of two or more) by multiplexing the data timing control signal DDC and the gate timing control signal GDC.

The backlight unit includes a first and a second light guide plate arrays 201 and 202, a first light array 203 for illuminating light to one end of the first light guide plate array 201, and a second light array 204 for illuminating light to one end of the second light guide plate array 202. Also, the backlight unit includes a plurality of optical sheets disposed between the first light guide plate array 201 and the liquid crystal display panel 10.

The first light guide plate array 201 includes a plurality of first light guide plates 201*a* to 201*g* divided in a first direction (e.g. column direction) as shown in FIGS. 3 to 6. The first light guide plates 201*a* to 201*g* are arranged in parallel to define a a plurality of first light guide channels in the first light guide plate array 201.

The second light guide plate array 202 is disposed under the first light guide plate array 201. The second light guide plate array 202 includes a plurality of second light guide plates 202*a* to 202*e* divided in a second direction (e.g. row direction) intersected with the first direction as shown in FIGS. 3 to 6. The second light guide plates 202*a* to 202*e* are arranged in parallel to define a plurality of second light guide channels in the second light guide plate array 202.

Figure 5B:
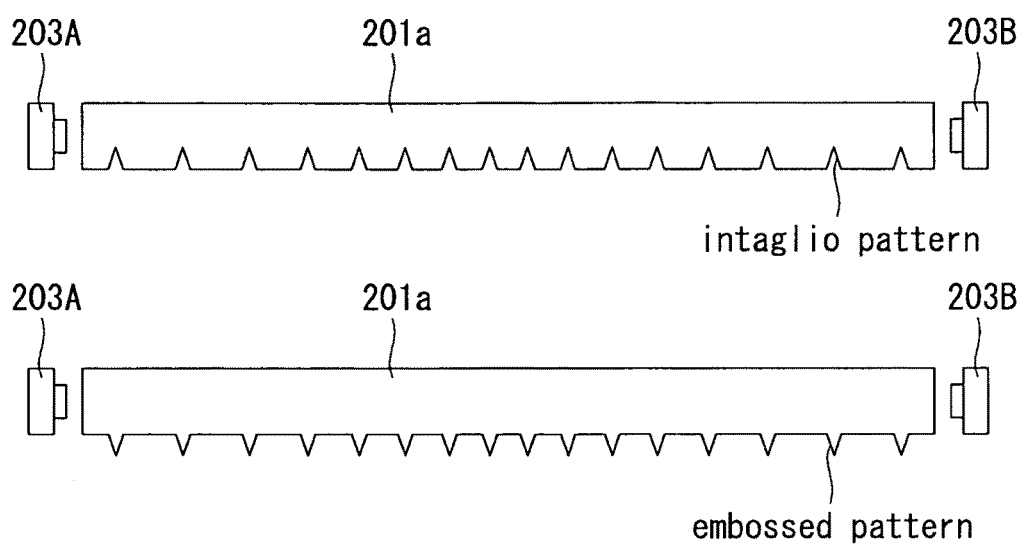
FIG. 5B is a side view of a light guide plate having intaglio or embossed patterns.
Figures 6, 7:
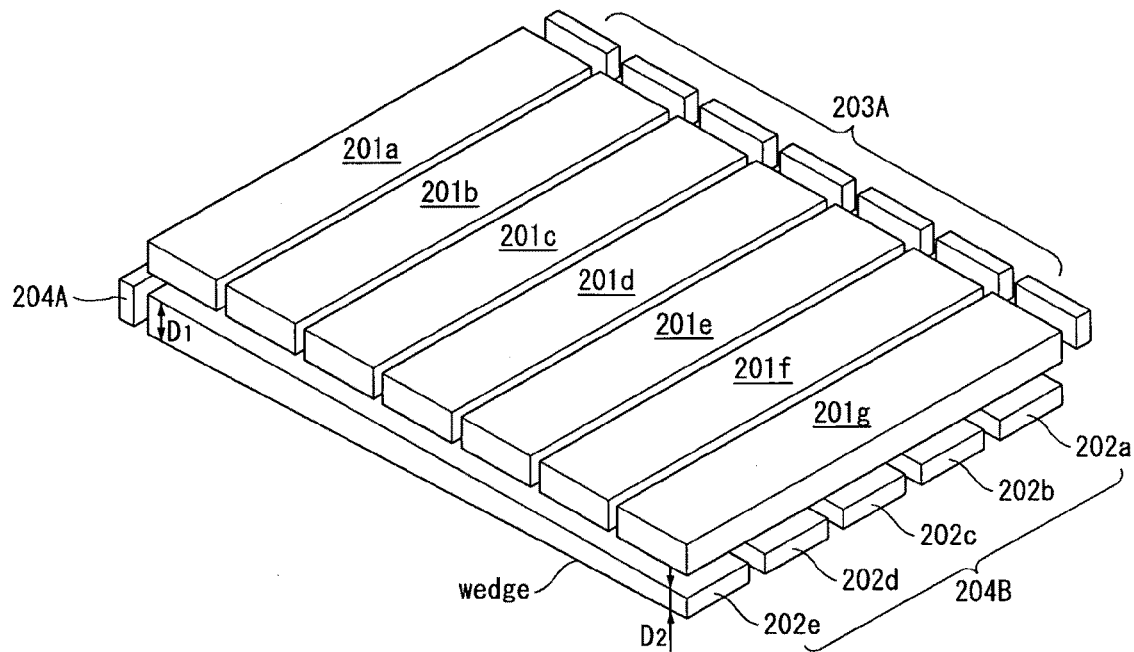
FIG. 6 is a perspective view of FIG. 4.
FIG. 7 is a diagram showing blocks formed by the first and second light guide plates disposed to cross each other.

The first light guide plates 201*a* to 201*g* and the second light guide plates 202*a* to 202*e* are arranged to be crossed each other and define a matrix type blocks B11 to B57 as shown in FIG. 7. The local dimming is implemented by dividing a surface light incedent to the liquid crystal display panel 10 to correspond to the blocks B11 to B57. Each of the first light guide plates 201*a* to 201*g* may have minute intaglio or embossed patterns which are formed on upper surface and/or lower surface thereof. Each of the second light guide plates 202*a* to 202*e* may also have minute intaglio or embossed patterns which are formed on upper surfaces and/or lower surfaces thereof. However, it is preferable that the minute intaglio or embossed patterns are formed on lower surfaces of the first light guide plates 201*a* to 201*g* as shown in FIG. 5B. The minute intaglio or embossed patterns reflects light from the light guide channels defined by the light guide plates to the optical sheets and the liquid crystal display panel 10. The more minute intaglio or embossed patterns are far from the first and second light arrays 203 and 204, the more minute intaglio or embossed patterns are formed in dense. It compensates the luminance at the position far from the light sources to meet the evenness of the surface luminance in each of the light guide channels. The first light guide plates 201*a* to 201*g* and the second light guide plates 202*a* to 202*e* are made of a transparent flat plate resin, respectively. Otherwise, the first light guide plates 201*a* to 201*g* are made of transparent flat plate resin, and the second light guide plates 202*a* to 202*e* are made of a wedge plate of which lower surface is inclined.

Each of the first and second light arrays 203 and 204 includes a plurality of point light sources such as light emitting diodes (LEDs).

Figure 5A:
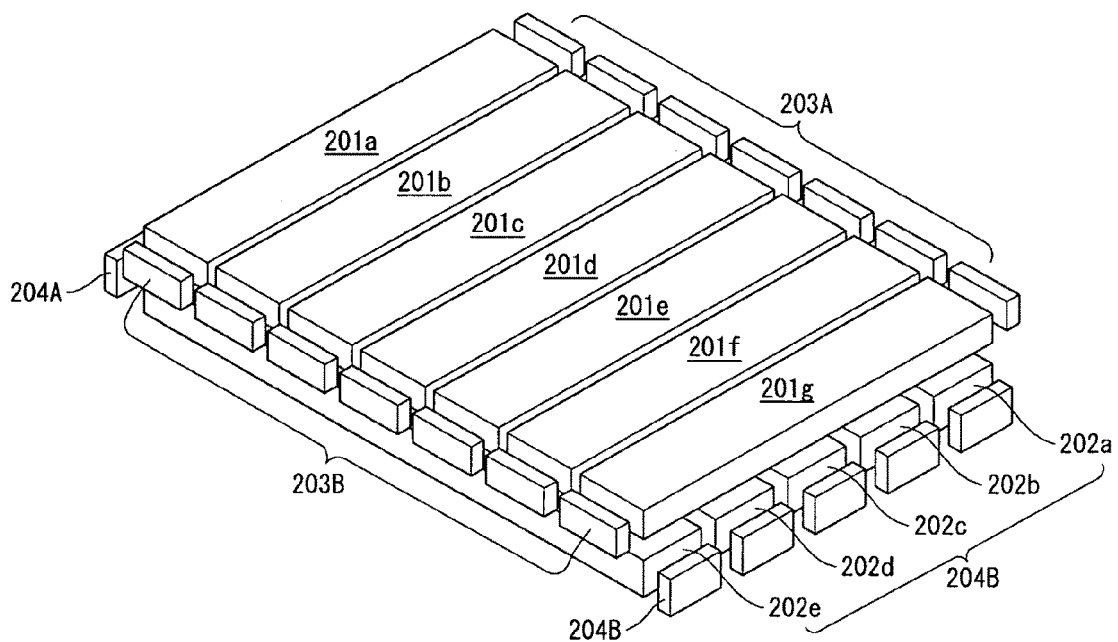
FIG. 5A is a perspective view of FIG. 3

The first light array 203 includes a 1-1 light array 203A disposed to face one ends of the first light guide plates 201*a* to 201*g* and a 1-2 light array 203B disposed to face the other ends of the first light guide plates 201*a* to 201*g* as shown in FIGS. 3 and 5. Otherwise, the first light array 203 may be disposed to face only one ends of the first light guide plates 201*a* to 201*g* as shown in FIGS. 4 and 6. In case of that the light sources of the first light array 203 are disposed to face only one ends of the first light guide plates 201*a* to 201*g*, respectively, each of the first light guide plates 201*a* to 201*g* is preferably made of the transparent flat plate resin to secure a coupling stability in relation with the second light guide plates 202*a* to 202*e* disposed thereunder as shown in FIG. 6. An amount of emitting light of each light source in the first light array 203 is independently controlled by current supplied from the first light array driving part 21. The light emitted from the first light array 203 is totally reflected in the first light guide plates 201*a* to 201*g* and is propagated along the light guide channels defined by the first light guide plates 201*a* to 201*g* in a high going-straight property.

The second light array 204 includes a 2-1 light array 204A disposed to face one ends of the second light guide plates 202*a* to 202*e* and a 2-2 light array 204B disposed to face the other sides of the second light guide plates 202*a* to 202*e* as shown in FIGS. 3 and 5. Otherwise, the second light array 204 may be disposed to face only one ends of the second light guide plates 202*a* to 202*e* as shown in FIGS. 4 and 6. In case that the light sources of the second light array 204 are disposed to face only one ends of the second light guide plates 202*a* to 202*e*, respectively, each of the second light guide plates 202*a* to 202*e* is preferably made of the transparent wedge plate in which a first thickness D1 at the position near to the second light array 204 is thicker than a second thickness D2 at the position opposite to the second light array 204 as shown in FIG. 6. An amount of emitting light of each light source in the second light array 204 is independently controlled by current supplied from the second light array driving part 22. The light emitted from the second light array 204 is totally reflected in the second light guide plates 202*a* to 202*e* and is propagated along the light guide channels defined by the second light guide plates 202a to 202e in a high going-straight property.

The first light array driving part 21 adjusts an intensity of current to be supplied to each light source of the first light array 203 under the control of the picture analyzing part 16. The first light array driving part 21 adjusts the current supplied to a light source of the first light array 203 which undertakes a block corresponding to a bright area displayed on the display screen of the liquid crystal display panel 10 depending on a local dimming signal LDIM supplied from the picture analyzing part 16 so that the current supplied to the light source of the first light array 203 is high. On the other hand, the first light array driving part 21 adjusts the current supplied to another light source of the first light array 203 which undertakes the another block corresponding to a dark area displayed on the display screen of the liquid crystal display panel 10 depending on another local dimming signal LDIM supplied from the picture analyzing part 16 so that the current supplied to the another light source of the first light array 203 is low.

The second light array driving part 22 adjusts an intensity of current to be supplied to each light source of the second light array 204 under the control of the picture analyzing part 16. The second light array driving part 22 adjusts the current supplied to a light source of the second light array 204 which undertakes a block corresponding to a bright area displayed on the display screen of the liquid crystal display panel 10 depending on a local dimming signal LDIM supplied from the picture analyzing part 16 so that the current supplied to the light source of the second light array 204 is high. On the other hand, the second light array driving part 22 adjusts the current supplied to another light source of the second light array 204 which undertakes another block corresponding to a dark area displayed on the display screen of the liquid crystal display panel 10 depending on another local dimming signal LDIM supplied from the picture analyzing part 16 so that the current supplied to the another light source of the second light array 204 is low.

The picture analyzing part 16 analyzes the digital picture data RGB input from the system board, maps the input digital picture data to the blocks B11 to B57 shown in FIG. 7 based on the analyzed result, and analyzes the luminance of the input digital picture data for each block using a picture analysis method such as a histogram analysis method. The picture analyzing part 16 generates the local dimming signal LDIM for adjusting the current supplied to the first and second light arrays 203 and 204 with reference to the luminance analyzed for each block to control the first and second light array driving part 21 and 22. The picture analyzing part 16 is synchronized with the timing controller 11 by the timing signals Vsync, Hsync, DE and DCLK to synchronize the driving timing of the first and second light arrays 203 and 204 with the displaying timing of the digital picture data RGB. The picture analyzing part 16 may be mounted to the external system board or be integrated into the timing controller 11.

Figure 8:
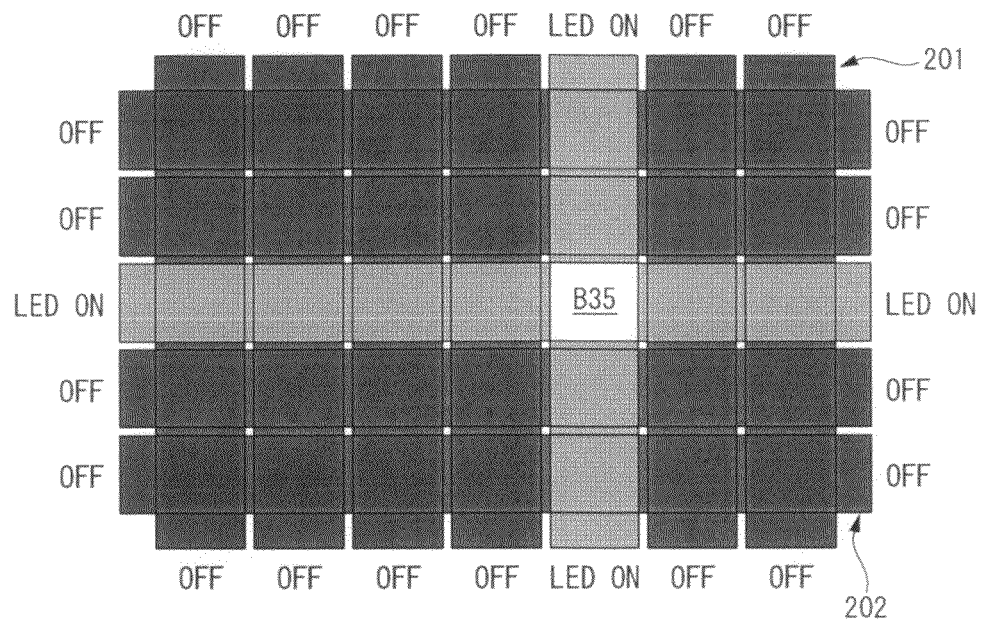
FIG. 8 is a diagram showing one example of implementing a local dimming by the lamination structure of the first and second light guide plates.

FIG. 8 shows one example implementing the local dimming by arrangement of the first and the second light guide plate arrays 201 and 202. In the exemplary embodiment, the luminance of the surface light incident to the liquid crystal display panel 10 is divided into the block size shown in FIG. 7 by arranging the first light guide plates 201a to 201g of the first light guide plate array 201 and the second light guide plates 202a to 202e of the second light guide plate array 202 so that they are intersected each other. The luminance of each block is determined by a sum of luminance of the first and second light guide channels at each block. That is, the luminance of a specific block is determined by amount of light incedent to the first and second light guide plates in which they are cross each other to form the specific block. For example, if the amount of light incedent to the first and second light guide plates is increased, it is possible to implement the local dimming because the luminance of the specific block is higher than that of the other blocks.

Figure 9:
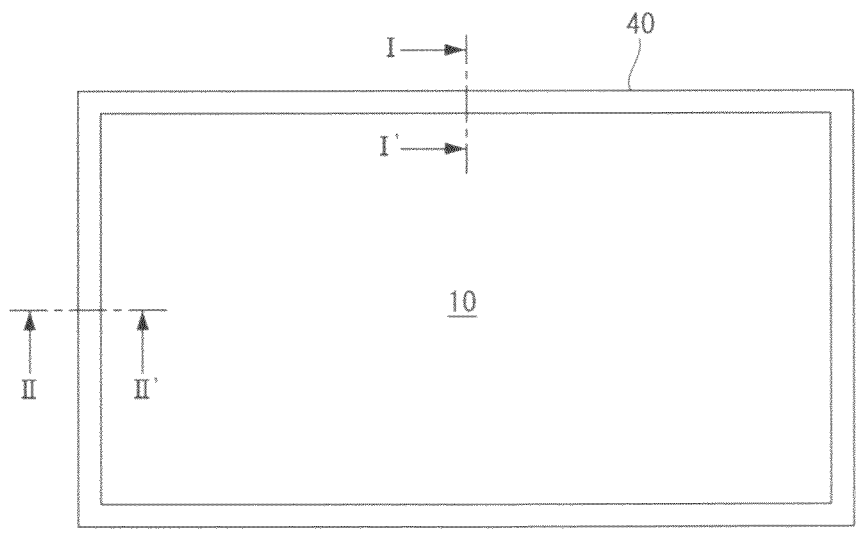
FIG. 9 is a plan view showing a liquid crystal module in which a liquid crystal display panel is assembled with a backlight unit.
Figure 10A:
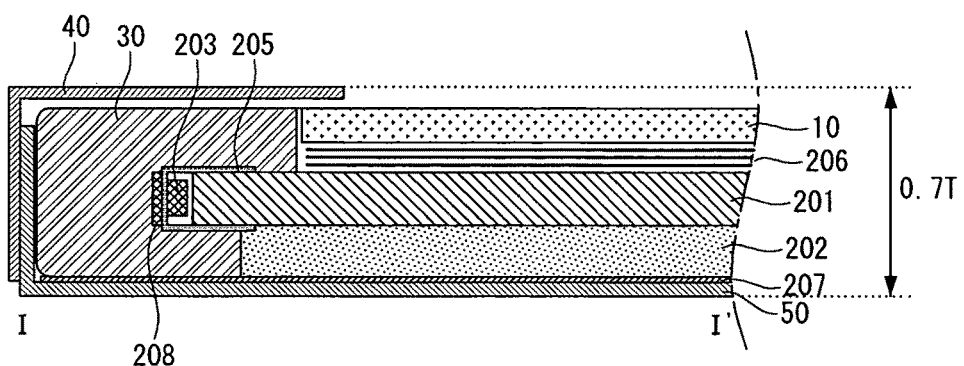
FIG. 10A is a sectional view of the liquid crystal module taken along line I-I' of FIG. 9.

FIG. 9 is a plan view showing a liquid crystal module in which the liquid crystal display panel 10 is assembled with the backlight unit. FIG. 10A is a sectional view of the liquid crystal module taken along line I-I' of FIG. 9, and FIG. 10B is a sectional view of the liquid crystal module taken along line II-II' of FIG. 9.

Figure 10B:
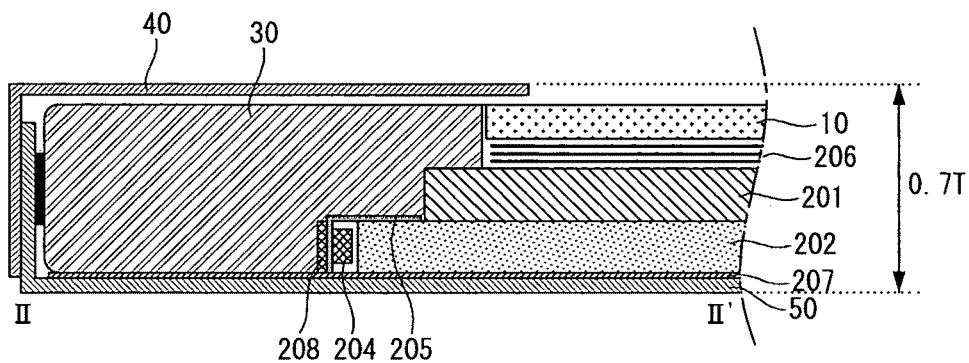
FIG. 10B is a sectional view of the liquid crystal module taken along line II-II' of FIG. 9.

Referring to FIGS. 9 to 10B, the liquid crystal module according to the exemplary embodiment of the invention includes a liquid crystal display panel 10, a backlight unit including a plurality of elements 201 to 208, and a guide and case member supporting the liquid crystal display panel 10 and the backlight unit. The guide and case member includes a guide panel 30, a top case 40 and a bottom cover 50.

The guide panel 30 is made of mixing glass fiber into synthetic resins to form a rectangular frame, and surrounds the edges of the liquid crystal display panel 10 and the backlight unit. The guide panel 30 has inner surfaces in which a plurality of stepped grooves are formed. A lamp housing 205, the first and second light arrays 203 and 204 and a metal printed circuit board (MPCB) 208 are inserted into the stepped grooves of the guide panel 30. The stepped grooves face to one side of the construction in which the liquid crystal display panel 10 and the backlight unit are laminated.

The MPCB 208 includes a first MPCB to which the first light array 203 is mounted and a second MPCB to which the second light array 204 is mounted. The first MPCB includes a first circuit for electrically connecting the first light array 203 with the first light array driving part 21, and the second MPCB includes a second circuit for electrically connecting the second light array 204 with the second light array driving part 22. The lamp housing 205 is made of metal having a high reflectance, is coupled with the stepped groove of the guide panel 30, is bent to surround the first and second light arrays 203 and 204, and reflects the light incedent from the first and second light arrays 203 and 204 to the first and second light guide plates 201a to 201g and 202a to 202e. The optical sheets 206 are disposed between the liquid crystal display panel 10 and the first light guide plate array 201. The optical sheets 206 includes at least one prism sheet and at least one diffusion sheet, diffuses the light-incedent from the diffusion sheet, and refracts a progress path of light in a direction perpendicular to the light-incedent surface of the liquid crystal display panel. Also, the optical sheets 206 may comprise a dual brightness enhancement film (DBEF).

The bottom cover 50 is made of a metal to form a rectangular shape frame, and surrounds a lower surface of the guide panel 30 and the backlight unit. A reflector sheet 207 is disposed between a lower surface of the second light guide plate array 202 and the bottom cover 50.

The top case 40 is made of a metal to form a rectangular frame, and surrounds the edge (or bezel area) of the upper surface of the liquid crystal display panel 10, an upper surface of the guide panel 30 and side surface of the bottom cover 50. The side wall of the top case 40 is overlapped with the side wall of the bottom cover 50. The top case 40 and the bottom cover 50 are coupled each other by a screw going through the overlapped side walls.

Figure 11A:
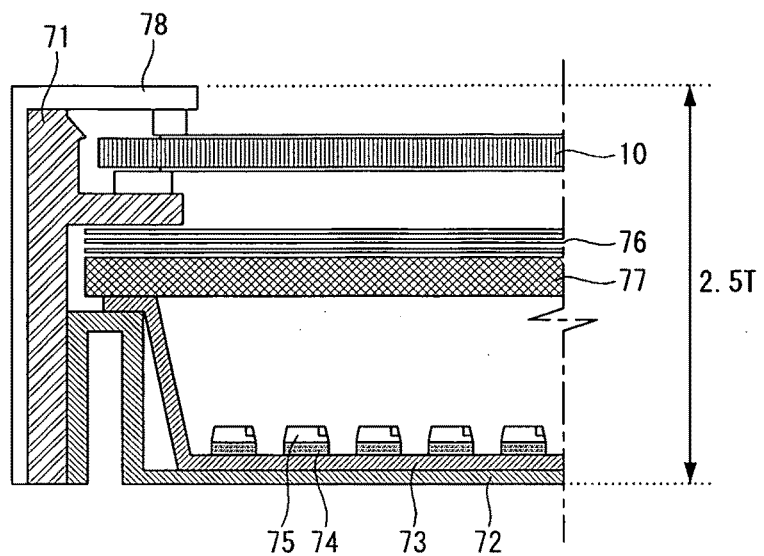
FIG. 11A is a sectional view showing a liquid crystal module using light emitting diodes (LEDs) as a light source.
Figure 11B:
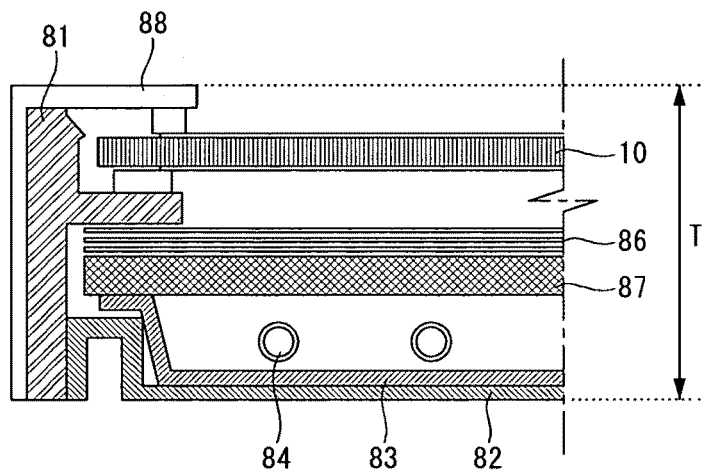
FIG. 11B is a sectional view showing a liquid crystal module using cold cathode fluorescent lamps (CCFLs) as a light source.

FIG. 11A is a sectional view showing a liquid crystal module having a direct type backlight unit using light emitting diodes (LEDs) as light sources, and FIG. 11B is a sectional view showing another liquid crystal module having a direct type backlight unit using cold cathode fluorescent lamps (CCFLs) as the light sources. The liquid crystal module shown in FIG. 11A includes a diffusion plate 77 and optical sheets 76 disposed between the liquid crystal display panel 10 and LED packages 75. Also, the liquid crystal module includes a guide and case member having a guide panel 71 for fixing the liquid crystal display panel and the backlight unit. Also, the guide and case member further includes a bottom cover 72 and a top case 78. On the bottom cover 72, metal printed circuit boards (MPCBs) 74 to which the LED packages 75 are mounted and a reflector sheet 73 is disposed.

The liquid crystal module shown in FIG. 11B includes a diffusion plate 87 and optical sheets 86 disposed between the liquid crystal display panel 10 and CCFLs 84. Also, the liquid crystal module includes a guide and case member having a guide panel 81 for fixing the liquid crystal display panel 10 and the backlight unit. Also, the guide and case member further includes a bottom cover 82 and a top case 88. On the bottom cover 82, the CCFLs 84 and a reflector sheet 83 are disposed. The liquid crystal module shown in FIGS. 11A and 11B implements the local dimming by adopting the direct type backlight unit. However, it does not be appropriate in view of making the thickness of the liquid crystal display slim because the space between the diffusion plate 77 or 87 and the light sources 75 or 84 should be guaranteed. Accordingly, even though the thickness of the liquid crystal module shown in FIG. 11B is T, the thickness of the liquid crystal module shown in FIG. 11A is 2.5 T and the thickness of the liquid crystal module according to the exemplary embodiment of the invention is 0.7 T or less as shown in FIGS. 10A and 10B because it is unnecessary to consider the space for diffusing the light.

FIG. 12 is a diagram showing an experimental result measuring the luminance on the light guide plate in the direct type backlight unit and the light guide plates according to the exemplary embodiment of the invention.

In the experiment, inventors used same LED packages as the light sources, applied same current to the LED packages, and illuminated light supplied from the LED packages to the light guide plates in the direct type backlight unit and the light guide plates according to the exemplary embodiment of the invention, and respectively measured luminous flux on the light guide plates in the direct type backlight unit and the light guide plates according to the exemplary embodiment of the invention using a two dimensional picture measuring device.

As the experimental result, the luminous flux at one end (hereinafter, referred as a light-incident part) of the light guide plate in the direct type backlight unit to which the light is incident was measured at about 1.804 lm, and the luminous flux at the other end end (hereinafter, referred as a light-incident opposite part) of the light guide plate opposite to the light incident part was measured at about 0.429 lm. Accordingly, the luminous flux at the light-incedent opposite part is about 24% of the luminous flux at the light-incedent part. It means that the light is widely diffused at near the light-incedent part, and the amount of the light propagated to the light-incedent opposite part is decreased due to a low going-straight property of the light. Here, the light-incedent part means area of the light guide plate near to the light sources and the light-incedent opposite part means area of the light guide plate in opposite to the light sources.

In comparison, the luminous flux at the light-incedent part of the divided light guide plates according to the exemplary embodiment of the invention was measured at about 1.737 lm, and the luminous flux at light-incedent opposite part of the light guide plate was measured at about 0.860 lm. Accordingly, the luminous flux at the light-incedent opposite part is about 50% of the luminous flux at the light-incedent part. It shows that the light in the light guide channels defined by the divided light guide plates is propagated from the light-incedent part to the light-incedent opposite part at a high going-straight property. As a result, it is possible to control the luminance of all areas including the light-incedent opposite part in a block unit by the improvement of the going-straight property of light.

As known from the experimental result shown in FIG. 12 and the arrangement of the light guide channels shown in FIGS. 3 to 6, it is possible to decrease the luminance difference in each of the blocks B11 to B57 and independently control the luminance of each block, thereby capable of effectively implementing the local dimming in the edge type backlight unit.

As above-mentioned, it is impossible to implement the local dimming in the edgy type backlight unit according to the related art, but it is possible to implement the local dimming in the edgy type backlight unit according to the exemplary embodiment of the invention in which the divided light guide plates are disposed because the luminance of the plurality of blocks is independently controlled.

Accordingly, the backlight unit according to the exemplary embodiment of the invention and the liquid crystal display using the same can implement the local dimming by dividing the light guide channels which are cross each other and controlling the blocks defined by the light guide channels using the edge type construction in which the divided light guide plates are disposed, thereby capable of effectively implementing the local dimming in a slim thickness.

It will be apparent to those skilled in the art that various modifications and variations can be made to the structure of the invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A backlight unit comprising:
a first light guide plate array including a plurality of first light guide plates arranged in parallel in a first direction to define a plurality of first light guide channels;
a second light guide plate array including a plurality of second light guide plates arranged in parallel in a second direction intersected with the first direction to define a plurality of second light guide channels, the second light guide plate array being disposed under the first light guide plate array, wherein the first light guide plate array and the second light guide plate array define a matrix of blocks such that a luminance of each block is the sum of the luminance of the first and second light guide channels at each block;
a first light array arranged near at least one end of the first light guide plate array to illuminate light to the at least one end of the first light guide plate array;
a second light array arranged near at least one end of the second light guide plate array to illuminate light to the at least one end of the second light guide plate array;
a first light array driving part independently controlling an amount of emitting light of each light source in the first light array and adjusting the current supplied to a light source of the first light array depending on a local dimming signal supplied directly from a picture analyzing part; and
a second array driving part independently controlling an amount of emitting light of each light source in the second light array and adjusting the current supplied to a light source of the second light array depending on a local dimming signal supplied directly from the picture analyzing part, wherein the picture analyzing part generates the local dimming signal for adjusting the current supplied to the first and second light arrays with reference to the luminance analyzed for each block to control the first and second light array driving parts, wherein the first light array driving part is disposed along the first light array and the second light array driving part is disposed along the second light array, the first light array driving part not directly connected to the second light array driving part, wherein a long edge of the first light guide plate extends beyond or is shorter than a long edge of the second light guide plate in a first direction along a plane of the first and second light guide plates, wherein a short edge of the second light guide plate extends beyond or is shorter than a short edge of the first light guide plate in a second direction along the plane of the first and second light guide plates, the first and second directions being perpendicular to each other.

2. The backlight unit of claim 1, wherein surface light illuminated from the first and the second light guide plates is divided into a plurality of blocks formed by the intersection of the first light guide channels and the second light guide channels.

3. The backlight unit of claim 1, wherein the first light array includes a plurality of first light sources arranged to correspond to the one ends of the plurality of first light guide plates, and a plurality of second light sources arranged to correspond to the other ends of the first light guide plates, and the second light array includes a plurality of third light sources arranged to correspond to the one ends of the plurality of second light guide plates, and a plurality of fourth light sources arranged to correspond to the other ends of the second light guide plates.

4. The backlight unit of claim 1, wherein the light guide plates in at least one of the first and second light guide plate arrays have minute intaglio or embossed patterns which are formed on at least one of upper and lower surfaces, and the more minute intaglio or embossed patterns are far from the first or the second light array, the more minute intaglio or embossed patterns are formed in dense.

5. The backlight unit of claim 1, wherein each of the first and second light guide plates has a flat plate shape.

6. The backlight unit of claim 1, wherein each of the first light guide plates has a flat plate shape, and each of the second light guide plates has a wedge plate shape of which lower surface is inclined.

7. A liquid crystal display comprising:
a liquid crystal display panel; and
a backlight unit that illuminates light to the liquid crystal display panel,
wherein the backlight unit includes a first light guide plate array including a plurality of first light guide plates arranged in parallel in a first direction to define a plurality of first light guide channels, a second light guide plate array including a plurality of second light guide plates arranged in parallel in a second direction intersected with the first direction to define a plurality of second light guide channels, the second light guide plate array being disposed under the first light guide plate array, wherein the first light guide plate array and the second light guide plate array define a matrix of blocks such that a luminance of each block is the sum of the luminance of the first and second light guide channels at each block;

a first light array arranged near at least one end of the first light guide plate array to illuminate light to the at least one end of the first light guide plate array, a second light array arranged near at least one end of the second light guide plate array to illuminate light to the at least one end of the second light guide plate array, a first light array driving part independently controlling an amount of emitting light of each light source in the first light array and adjusting the current supplied to a light source of the first light array depending on a local dimming signal supplied directly from a picture analyzing part, and a second array driving part independently controlling an amount of emitting light of each light source in the second light array and adjusting the current supplied to a light source of the second light array depending on a local dimming signal supplied directly from the picture analyzing part, wherein the picture analyzing part generates the local dimming signal for adjusting the current supplied to the first and second light arrays with reference to the luminance analyzed for each block to control the first and second light array driving parts, wherein the first light array driving part is disposed along the first light array and the second light array driving part is disposed along the second light array, the first light array driving part not directly connected to the second light array driving part, wherein a long edge of the first light guide plate extends beyond or is shorter than a long edge of the second light guide plate in a first direction along a plane of the first and second light guide plates, wherein a short edge of the second light guide plate extends beyond or is shorter than a short edge of the first light guide plate in a second direction along the plane of the first and second light guide plates, the first and second directions being perpendicular to each other.

8. The liquid crystal display of claim 7, wherein surface light illuminated from the first and the second light guide plates is divided into a plurality of blocks having a matrix shape by the intersection of the first light guide light channels and the second light guide light channel.

9. The liquid crystal display of claim 7, wherein the first light array includes a plurality of first light sources arranged to correspond to the one ends of the plurality of first light guide plates, and a plurality of second light sources arranged to correspond to the other ends of the first light guide plates, and the second light array includes a plurality of third light sources arranged to correspond to the one ends of the plurality of second light guide plates, and a plurality of fourth light sources arranged to correspond to the other ends of the second light guide plates.

10. The liquid crystal display of claim 7, wherein the light guide plates in at least one of the first and second light guide plate arrays have minute intaglio or embossed patterns which are formed on at least one of upper surfaces, lower surfaces, and the more minute intaglio or embossed patterns are far from the first or the second light array, the more minute intaglio or embossed patterns are formed in dense.

11. The liquid crystal display of claim 7, wherein each of the first and second light guide plates has a flat plate shape.

12. The liquid crystal display of claim 7, wherein each of the first light guide plates has a flat plate shape, and each of the second light guide plates has a wedge plate shape of which lower surface is inclined.

* * * * *